United States Patent [19]

Martin

[11] 4,336,596
[45] Jun. 22, 1982

[54] METHOD AND APPARATUS FOR ELECTRONICALLY ROTATING A HEADING SIGNAL

[75] Inventor: Willie E. Martin, Garland, Tex.

[73] Assignee: E-Systems, Inc., Dallas, Tex.

[21] Appl. No.: 116,032

[22] Filed: Jan. 28, 1980

Related U.S. Application Data

[62] Division of Ser. No. 927,512, Jul. 24, 1978, Pat. No. 4,238,829, which is a division of Ser. No. 783,697, Apr. 1, 1977, Pat. No. 4,124,897.

[51] Int. Cl.³ ............................................. G01C 21/00
[52] U.S. Cl. ...................................... 364/559; 33/326; 33/356; 364/457; 364/571
[58] Field of Search ................... 364/559, 571, 457; 33/356, 357, 362, 326

[56] References Cited

U.S. PATENT DOCUMENTS

| | | | |
|---|---|---|---|
| 3,425,648 | 2/1969 | Wipff et al. | 33/357 |
| 3,946,691 | 3/1976 | Freeman | 364/457 |
| 3,975,621 | 8/1976 | Fowler | 364/457 |
| 4,013,946 | 3/1977 | Lewis | 33/362 |
| 4,031,630 | 6/1977 | Fowler | 33/356 |
| 4,091,543 | 5/1978 | Lapeyre | 33/356 |

FOREIGN PATENT DOCUMENTS

847182 7/1970 Canada .................................. 364/457

*Primary Examiner*—Errol A. Krass
*Attorney, Agent, or Firm*—Richards, Harris & Medlock

[57] ABSTRACT

In a vehicle locating apparatus that utilizes Hall effect generators to determine the magnetic heading of the vehicle there is provided magnetic compensation by the placing of a coil around the Hall generators. A current source generator provides power to the coil of such magnitude so as to create a magnetic field which cancels the spurious local magnetic field components. The appratus also includes a set of manual switches to program a constant number into the system. The system incorporates this number to compensate for variable wheel diameters and to allow the selection of variable map scale units. This number is utilized by the system in a division technique that repeatedly subtracts the number or adds the number to the accumulated distance traveled by the vehicle. The location of the vehicle is updated as the vehicle passes a transmitting signpost. Data transmitted to and from the vehicle locating apparatus is in a self-clocking format that reduces oscillator accuracy requirements. The system also includes a second set of manual switches for inputting a rotation angle. A variable time delay circuit incorporates this rotation angle to electronically increase or decrease the measured magnetic heading angle. This electronic rotation provides for a method to correct physical misalignment of the heading sensor in the vehicle and to compensate for local magnetic deviation.

6 Claims, 10 Drawing Figures

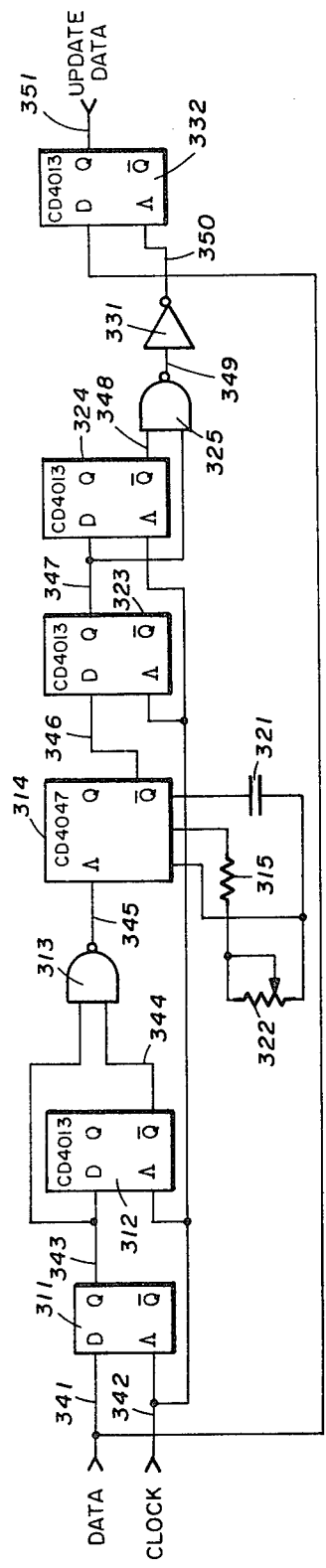
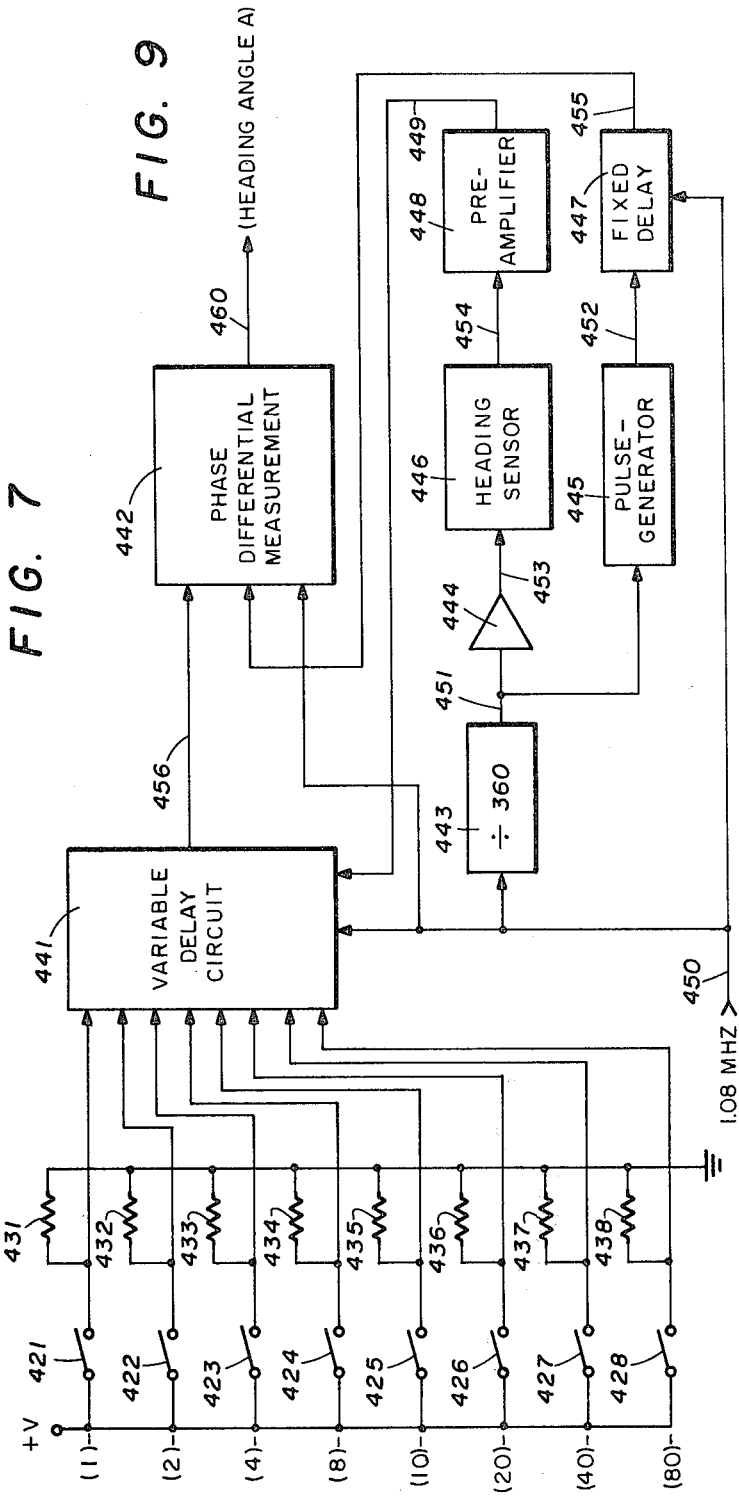

4,336,596

METHOD AND APPARATUS FOR ELECTRONICALLY ROTATING A HEADING SIGNAL

This is a division of application Ser. No. 927,512, filed July 24, 1978 now U.S. Pat. No. 4,238,829 which is a division of Ser. No. 783,697, Apr. 1, 1977, now U.S. Pat. No. 4,124,897.

FIELD OF THE INVENTION

The present invention relates to vehicle locating apparatus and more particularly to a vehicle locating apparatus utilizing an automatically updated dead reckoning system.

BACKGROUND OF THE INVENTION

A number of systems have been proposed for performing a vehicle locating function by utilizing an onboard compass and distance measuring device with dead reckoning and automatic position updating. The updating occurs whenever the vehicle passes a signpost that is transmitting its location. These systems are generally disclosed in U.S. Pat. Nos. 3,749,893 and 3,961,166. In actual operation such systems encounter a number of problems. These problems include compass errors caused by the metallic body of the vehicle, permanently magnetized iron in the proximity of the heading sensor and deviations in the earth's magnetic field. Other problems which have been encountered include inaccuracies due to varying wheel diameters, inconvenient map scale units, increased expense due to the high accuracy oscillators required in the update transmitters and receivers, and excessive time required to physically align the heading sensor in the vehicle.

Thus, there is a need for improvements over the existing vehicle locating systems using dead reckoning with proximity signpost updating.

SUMMARY OF THE INVENTION

A vehicle location system utilizing Hall effect generators to determine magnetic heading is provided with a compensation system that has an electrically conductive coil encircling the Hall effect generator and carrying current of such magnitude to cancel local magnetic field components, that is, except the earth's horizontal field.

Further, the vehicle locating apparatus of the present invention utilizes wheel rotation to measure distance traveled and provides for programming a constant number into the locating system to compensate for varying wheel circumferences and to incorporate selectable map scale units. This number is the quotient of the map scale unit divided by the wheel circumference and is repeatedly added to or subtracted from an accumulator that is measuring distance traveled. The number is added or subtracted to maintain the accumulator within a narrow range of values. The number of additions or subtractions is counted and stored and represents the distance traveled as measured by the selected map scale unit.

The vehicle locating system of the present invention also utilizes an update signpost transmitter in which the data format provides a self-clocking feature. The basic data rate is subdivided into three subperiods with the first and last of the subperiods at fixed but different logic levels. The received demodulation logic detects the transition from the third subperiod to the first subperiod and generates a sampling pulse that occurs in the middle of the second subperiod. The second subperiod is data dependent and the generated pulse samples the incoming data to determine its logic level.

The vehicle locating system is provided with means for manually programming electronic rotation of the heading angle. This means includes a set of switch inputs that operate a variable time delay circuit that delays the heading sensor output relative to the sensor input to provide the desired rotation.

BRIEF DESCRIPTION OF THE DRAWINGS

The novel features characteristic of the invention are set forth in the appended Claims. The invention itself, however, as well as further advantages thereof, will best be understood by reference to the following detailed description of an illustrative embodiment taken in conjunction with the accompanying drawings, in which:

FIG. 7 is a logic diagram for the update data demodulator;

FIG. 9 is a block diagram of the electronic rotation circuitry;

DETAILED DESCRIPTION OF THE PREFERRED EMBODIMENT

Figure 1:
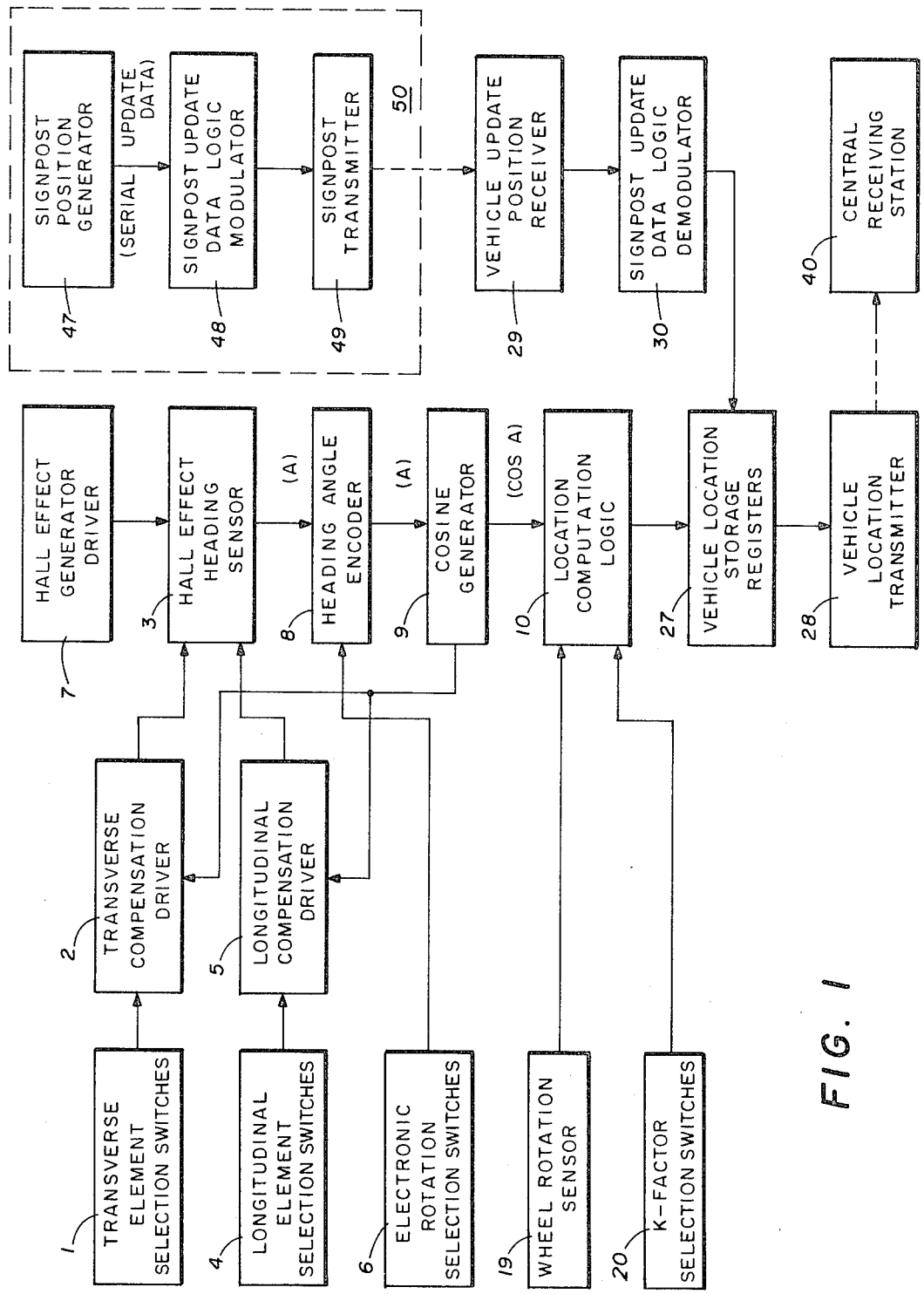
FIG. 1 is a block diagram of the vehicle locating system.

The functional operation of the vehicle locating system is shown in the block diagram of FIG. 1. The Hall effect heading sensor 3 determines the magnetic heading A of the vehicle and is driven by the Hall effect generator driver 7. Transverse and longitudinal compensation are provided by drivers 2 and 5 to the heading sensor 3. Compensation magnitude and polarity for both the transverse and longitudinal elements are provided by selection switches 1 and 4. The output of Hall effect heading sensor 3 is the analog value of the heading angle A which is digitized in encoder 8. Cosine generator 9 produces the cosine of the heading angle A which is input to the location computation logic 10. The current vehicle location is stored in register 27 and this location is transmitted to the central receiving station 40 by the vehicle locating transmitter 28.

The analog value of the heading angle A is rotated by an amount selected by switches 6. Rotation of the vehicle wheels is detected by sensor 19 and input to the location computation logic 10. K factor selection switches 20 input to the location computation logic 10 a value to compensate for varying wheel diameters and to determine the scale factor in which the vehicle's location is reported.

A signpost position unit 50 consists of a position generator 47 which outputs serial update data to a signpost update logic modulator 48. This data is then transmitted by the signpost transmitter 49 to the vehicle update position receiver 29. The received data is conveyed to the signpost update logic demodulator 30 and then to the vehicle location storage registers 27.

The operation of the vehicle location system is described in reference to FIG. 1. The Hall effect heading sensor 3 determines true magnetic heading due to the compensation provided by drivers 2 and 5. This compensation minimizes the local magnetic components except the earth's natural horizontal magnetic field. The magnitude and polarity of the compensation is determined by inputs to the selection switches 1 and 4 and the cosine of the measured heading angle A.

The electronic rotation selection switches 6 provide a method for compensation for physical misalignment of the heading sensor 3 within the vehicle and for the local magnetic deviation. The numerical value selected in the electronic rotation selection switches 6 either advance or retard the heading angle A provided by the encoder 8.

The K factor selection switches input a number between the values of 1 and 63 and 63/64ths. This factor is utilized by the location computation logic 10 to accommodate the distance measurements provided by wheel rotation sensor 19 and to provide a position output in terms of a predetermined map scale factor.

The vehicle location storage registers contain the current vehicle location as determined by the location computation logic. But when the vehicle passes within the proximity of a signpost update unit 50 an updated vehicle position is input to the vehicle location storage registers 27.

The signpost position generator 47 repetitively generates the serial update position of the signpost. The signpost update data logic modulator 48 modulates the update data in a format which is self-clocking and reduces the need for accurate oscillators. This data is transferred by the signpost transmitter 49 to the vehicle update position receiver 29. The output of receiver 29 is demodulated in the signpost update data logic demodulator 30 which then provides the signpost location to the vehicle location storage registers 27 and generates the clocking function necessary for demodulating the incoming data.

Figure 2:
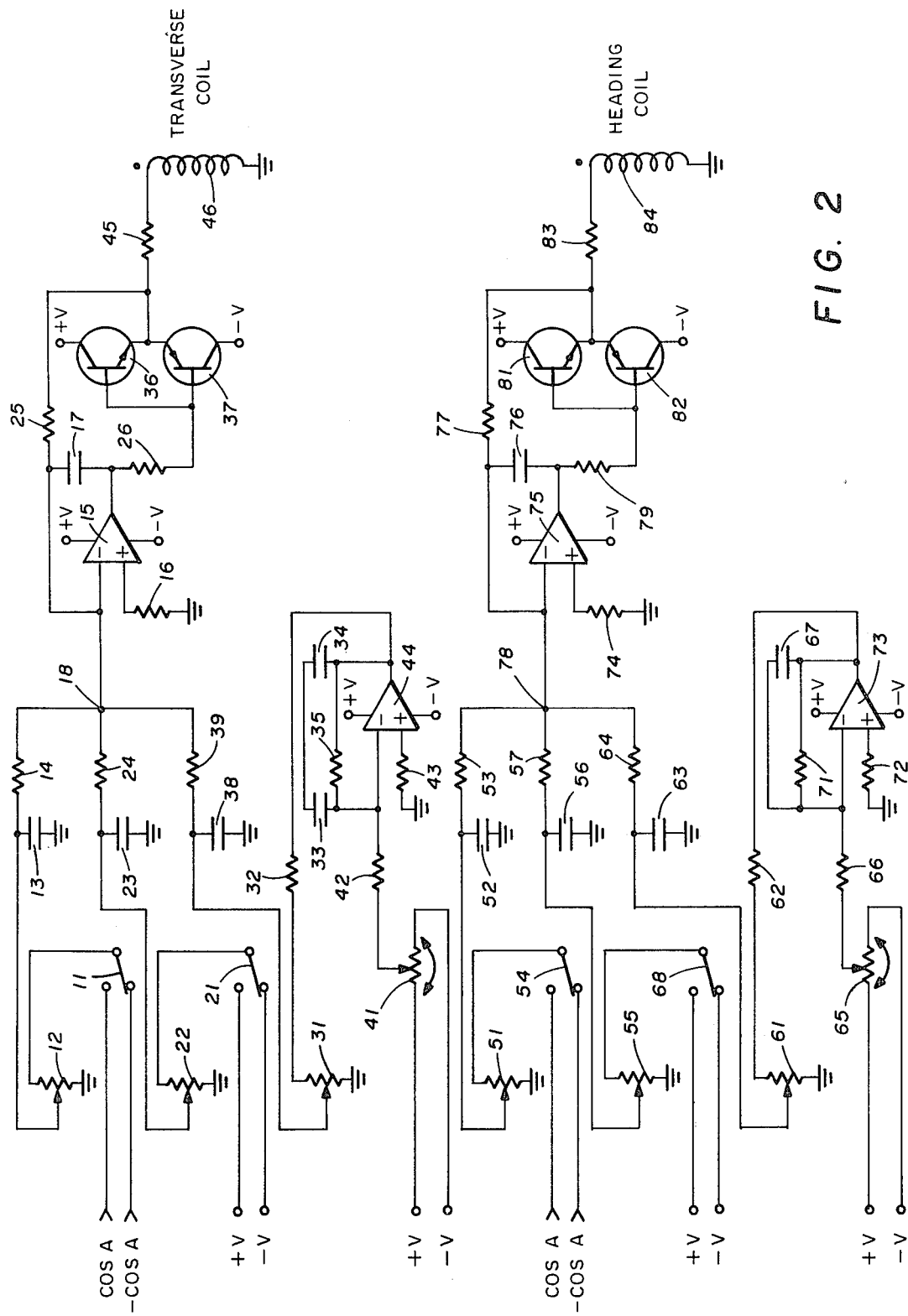
FIG. 2 is a schematic diagram of the Hall effect sensor compensation circuit.

Referring to FIG. 2, the positive or negative cosine of a heading angle A is selectively connected by two position switch 11 to the negative input of an amplifier 15 through a variable resistor 12 and a series input resistor 14. Also included in the input circuit of the amplifier 15 is a capacitor 13 tied at one terminal to ground. A positive or negative DC voltage is selectively connected by a two position switch 21 to the negative input of the amplifier 15 through a variable resistor 22 and a series input resistor 24. Also forming a part of this input circuit is a capacitor 23 tied at one terminal to ground.

The freely swinging member of a pendulous resistor 41 is connected through an input resistor 42 to the negative input of an amplifier 44. The end terminals of the resistive body of the pendulous resistor 41 are tied to positive and negative DC voltages. Connected to the positive input of the amplifier 44 is an input resistor 43 with a grounded second terminal. In the feedback loop of the amplifier 44, connected between its output and its negative input, is a resistor 35 in parallel with the series combination of a capacitor 33 and a capacitor 34. The output of amplifier 44 is connected through the series combination of a resistor 32, a variable resistor 31 and a resistor 39 also to the negative input of the amplifier 15.

Also included as a part of this input circuit of the amplifier 15 is a capacitor 38 having one terminal tied to ground. Connected to the positive input of the amplifier 15 is an input resistor 16 with a grounded second terminal.

Forming the feedback loop of the amplifier 15, connected between the output and its negative input is a feedback capacitor 17. Also tied to the output of the amplifier 15 is an input resistor 26 connected to the base terminals of power transistors 36 and 37. These transistors constitute the driving amplifier for a transverse coil 46 through an input resistor 45. The output voltage at the emitter electrodes of transistors 36 and 37 is connected through a feedback resistor 25 to the negative input of the amplifier 15.

The positive or negative cosine of the heading angle A is also selectively connected by a two position switch 54 to the negative input of an amplifier 75 through a variable resistor 51 and a series input resistor 53. Also included as a part of this input circuit to the amplifier 75 is a capacitor 52 that is tied at one terminal to ground. A positive or negative DC voltage is also selectively connected by a two position switch 68 to the negative input of the amplifier 75 through a variable resistor 55 and a series input resistor 57. This input circuit to the amplifier 75 further includes a capacitor 56 that is tied at one terminal to ground.

A pendulous resistor 65 has a pendulum arm that is free to swing in the longitudinal axis of the vehicle, and has a resistive element connected to positive and negative DC voltages. The pendulous element is connected through series input resistor 66 to the negative input of an amplifier 73. A series resistor 72 is connected at one terminal to the positive input of the amplifier 73 and to ground at the other terminal. Feedback elements for the amplifier 73 are connected between its output and its negative input and consists of a resistor 71 in parallel with a capacitor 67.

The output of the amplifier 73 is connected through the series combination of a resistor 62, a variable resistor 61 and a resistor 64 to the negative input of the amplifier 75. A capacitor 63 is tied at one terminal to the negative input circuit of the amplifier 75 and at the other terminal to ground. A resistor 74 is connected at one terminal to the positive input to the amplifier 75 and at the other terminal to ground.

The output signal of the amplifier 79 is connected through the series resistor 79 to the base electrodes of driver transistors 81 and 82. This output signal is also connected through feedback capacitor 76 to the negative input of the amplifier 75. The transistors 81 and 82 with interconnected emitters constitute an amplifier which drives a heading coil 84 through a load resistor 83. The output of the driver amplifier, consisting of transistors 81 and 82, is connected through feedback resistor 77 to the negative input of the amplifier 75.

The operation of the compensation circuit can be more fully understood by referring to FIG. 2. The detector portion of the solid state compass consists of two Hall effect generators orthogonally mounted in the horizontal plane. Approximately 200 turns of wire are wrapped around each of the Hall effect generators. These coils are shown as transverse coil 46 and heading coil 84. Current is caused to flow through these two coils in such a manner as to create a magnetic field which is equal in magnitude but opposite in direction to the unwanted magnetic fields affecting the generators. These induced magnetic fields cancel the unwanted magnetic fields, thereby leaving the detector to measure only the earth's natural horizontal magnetic field. The unwanted magnetic fields are of three types. Fundamental interference that is caused by the presence of any permanently magnetized body on the vehicle itself. Second harmonic interference that is caused by the presence of any soft iron near the magnetic detector. And, the third type of interference consists of unwanted vertical components of the earth's magnetic field that are introduced into the detector by either roll or pitch of the detector.

The transverse coil 46 provides compensation for fundamental interference, second harmonic interference, and roll interference. The compensation current for fundamental interference is a constant value which is determined by variable resistor 22. The compensation current for the second harmonic interference is a function of the heading angle A the cosine of which is supplied through switch 11. The output of switch 11 is provided to variable resistor 12 which is adjusted to determine the magnitude of the compensation current for second harmonic interference. The roll compensation current is determined by the pendulous resistor 41. The pendulum element is free to swing only in the transverse plane. The output of pendulous resistor 41 is fed through amplifier 44 and its associated circuitry then through resistor 32 and variable resistor 31 which determines the magnitude of the roll compensation. These three compensation currents, fundamental, second harmonic and roll, are summed at point 18. These summed compensation currents are then amplified by amplifier 15 and then applied to the combination of transistors 36 and 37 with the resulting current directed to the compensation coil 46. The current in coil 46 then creates the appropriate counteracting magnetic field to cancel the spurious magnetic field components.

In a similar fashion compensation currents for fundamental interference, second harmonic interference and pitch are generated and fed to summing point 78. The pendulum element of pendulous resistor 65 is allowed to swing only in the longitudinal plane. The resulting current is then amplified and fed to heading coil 84 to create the appropriate counteracting magnetic field to cancel the spurious magnetic field components associated with the heading coil.

Thus, in this manner, the Hall effect generators will respond only to the horizontal component of the earth's natural magnetic field and thereby produce an accurate magnetic heading.

Figure 3:
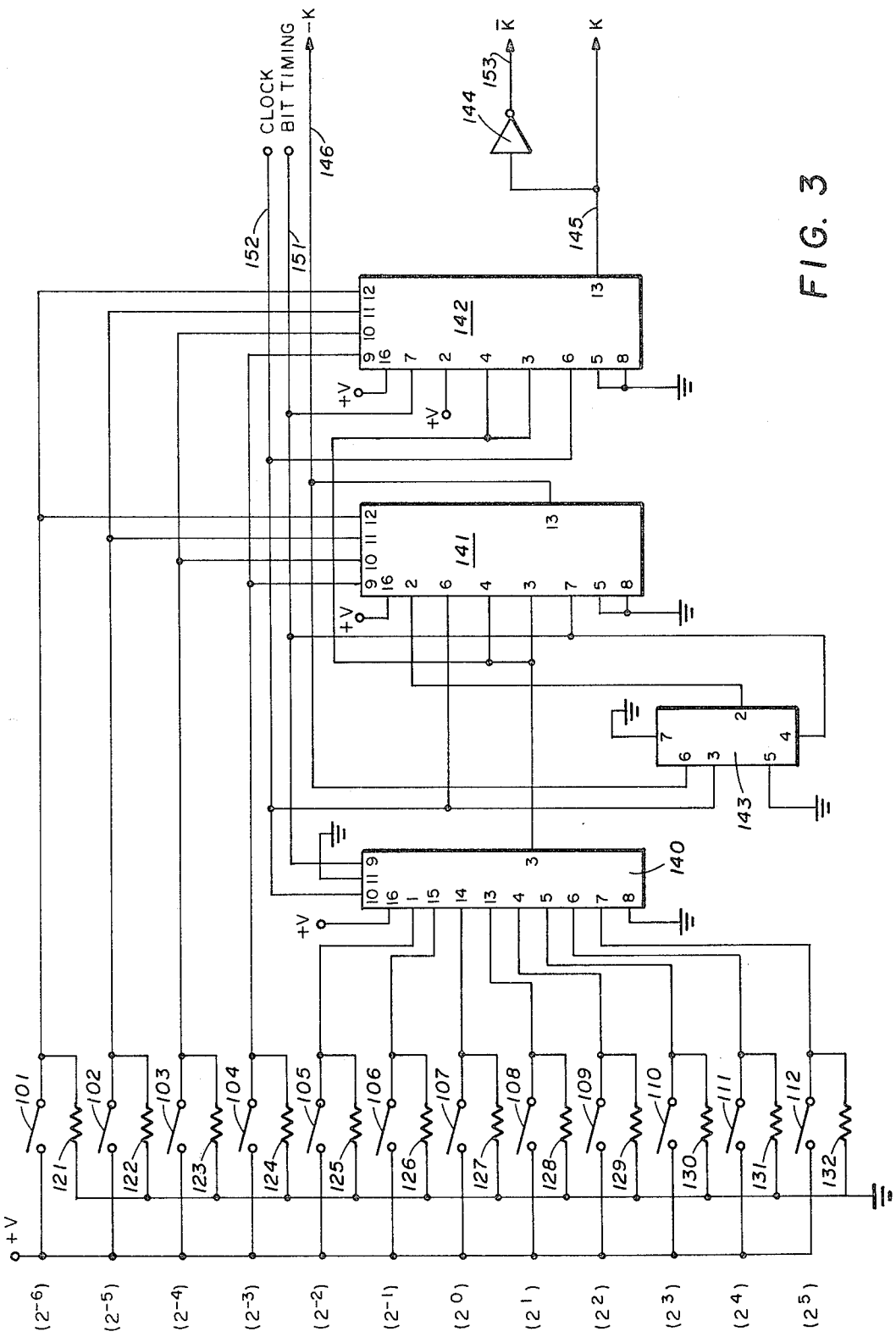
FIG. 3 is a schematic diagram for the map scale factor and wheel diameter compensation circuit.

Referring now to FIG. 3, a map scale factor and wheel diameter adjustment constant K is programmed into the system with a bank of input switches 101-112. Each of these switches is connected to the positive voltage supply. The contact arms of the switches are connected through resistors 121-132, respectively, to ground. Thus, when a switch is open the line going to the logic is at a low level, but when the switch is closed the line voltage goes to a high level. The input switches 105-112 are connected to a shift register 140 and input switches 101-104 are connected to shift register 141 and 142. Connected to the output of shift register 142 by means of a line 145 is the input of an inverter 144. A flip-flop 143 is connected to registers 140, 141 and 142.

A clock signal is input on line 152 and a bit timing signal is input on line 151.

In the present embodiment the shift register 140 is an integrated circuit type CD 4014 chip, registers 141 and 142 are integrated circuits type CD 4035, and flip-flop 143 is a type CD 4027 chip. The pin connections are as shown in FIG. 3.

Operationally, the constant K is programmed into the system in powers of 2 as shown in parentheses beside the corresponding switch. The value of the constant K in this embodiment ranges from a minimum of 1 to a maximum of 63 and 63/64ths. Each of the switches 101-112 corresponds to a power of 2 ranging from minus 6 to positive 5. For example, if the constant K is 2 3/16, the switches 108, 104, and 103 would be closed with the remaining switches left open. The logic levels of switches 105-112 are shifted in parallel fashion into shift register 140. The logic levels of switches 101-104 are shifted in parallel fashion into shift registers 141 and 142. The value of K is converted into serial form and output on line 145. The output of inverter 144 on line 153 is the 1's complement of K, as represented by $\overline{K}$. The 2's complement of K, represented as $-K$, is produced on line 146.

Figure 4:
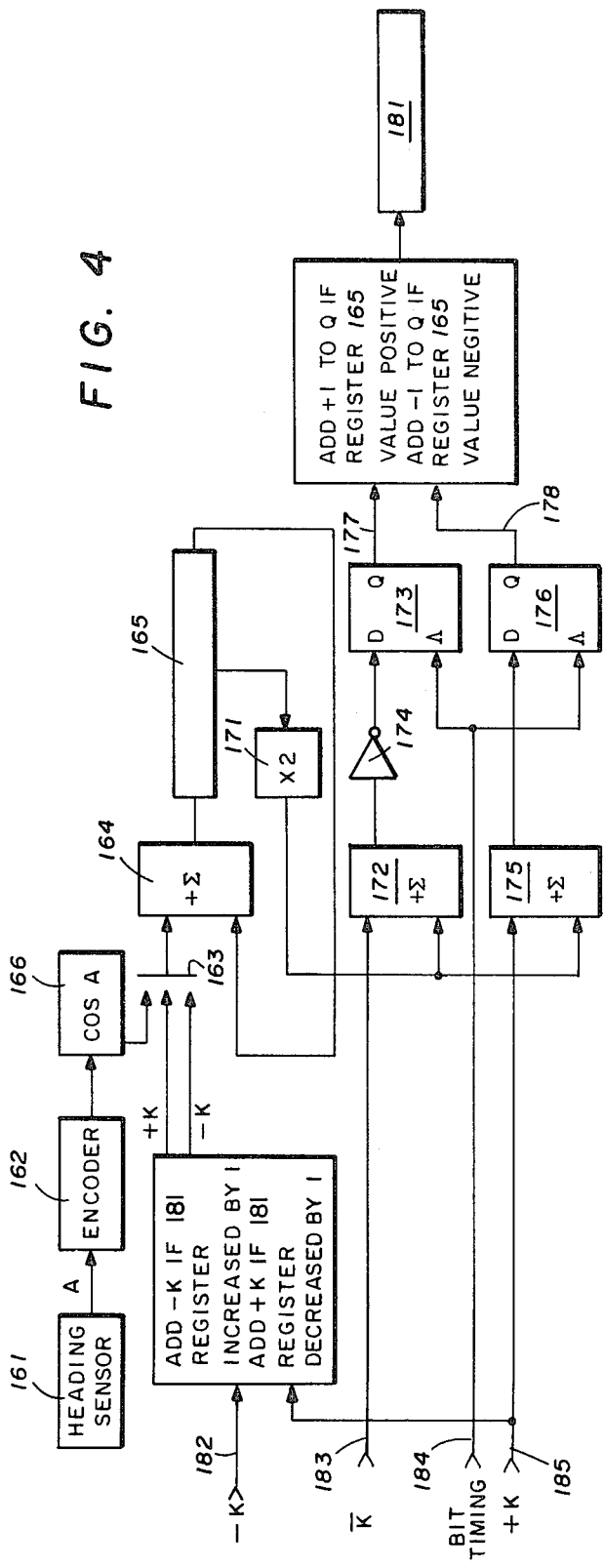
FIG. 4 is a block diagram of the map scale factor and wheel diameter compensation circuit.

The functional operation of the value K in the vehicle locating system is shown in FIG. 4. A heading sensor 161 determines the magnetic heading angle A of the vehicle. The analog value of the heading angle A is transferred into an encoder 162 where it is digitized and the digital heading is then applied to a trigonometric function circuit 166 which produces the cosine of the heading angle. The cosine of the heading angle is then transmitted through switch 163 to the upper input of a digital summer 164 with the output of the digital summer 164 going to an accumulating register 165. One output of the accumulating register 165 goes to a multiply-by-two circuit 171. The output of multiply-by-two circuit 171 is transferred to one input digital summers 172 and 175. The output of summer 172 is conveyed through an inverter 174 to the input of a D-type flip-flop 173. The output of the summer 175 is transferred to the input of a D-type flip-flop 176. The outputs of the flip-flops 173 and 176 are selectively connected to a register 181.

The two's complement of the number K is input on line 182. The one's complement of the number K is input on line 183 and the numerical value of K is input on line 185. Bit timing for the flip-flops 173 and 176 is input on line 184 from a bit time clock source.

In the present embodiment, digital summers 164, 172 and 175 and inverter 174 are in a type CD 4032 AE integrated circuit. The flip-flops 173 and 176 are in a type CD 4013 integrated circuit.

The value K determines the map unit scale factor that is used to report the movement of the vehicle. It is the quotient of the map scale unit divided by the wheel circumference. The value of K can also be calculated as follows. The vehicle is driven a distance of at least 10 miles where the distance can be measured accurately to within ½%. During this drive, the number of wheel rotations is counted. Next, an arbitrary scale factor is selected, for example, 10 feet or 10 meters. K is then calculated by dividing the number of wheel revolutions by the quotient of the distance traveled divided by the scale factor. The fractional portion of the value K must then be converted to a fraction in 64ths. For example, if the distance traveled is 11 miles and the number of wheel revolutions is 8249 and the scale factor is 10 feet the resulting value of K is 1 and 27/64ths. Thus, the tire diameter has been incorporated into the system and the movement of the vehicle will be reported in units of 10's of feet.

Referring to FIG. 4, for each wheel rotation the value of the cosine of the heading angle A is added into accumulating register 165. Accumulating register 165 acts as an accumulator storing each value of the cosine of the heading with the distance value of each unit in accumulating register 165 equal to one scaled wheel circumference. The combination of the summer 172, the inverter 172 and the flip-flop 173 performs a monitoring function by providing an output on line 177 when the value stored in register 165 is greater than one-half the value of K. A monitoring function is also provided by the summer 175 and the flip-flop 176 as an output on line 178 when the value stored in register 165 becomes less than one-half the negative value of K.

Register 181 performs an accumulator function for the K overflow values on lines 177 and 178 and indicates the north/south location of the vehicle in the units that were chosen to determine the value of K. The number stored in register 181 is the distance the vehicle travels from a predetermined reference point. This is the value of Y in a conventional X-Y Cartesian coordinate system. When there is an output on line 177 one unit is added to register 181. When there is an output on line 178 one unit is subtracted from register 181.

When any change is made in register 181 the value stored in register 165 is modified by addition of a plus or minus value of K as selected by switch 163. A minus K value is selected by switch 163 if a positive unit was added to register 181 and a positive value of K is selected by switch 163 if a negative unit was added to register 181. This new value, which consists of the old value in register 165 and either plus or minus K, is accumulated in register 165. The overall result of this operation is the dividing of the accumulated heading value by the constant K and the division is the vehicle location which is stored in register 181 in the map scale unit selected in determining the value of K.

The process of adding or subtracting the value K to register 165 maintains the value in this register within the range of plus or minus K. This technique maintains the maximum possible accuracy with a given size of register.

Register 181 provides the north/south location of the vehicle from a central reference point. If in unit 166 the sine of the heading angle A is used in place of the cosine of the heading angle A then register 181 will accumulate the vehicle position in east/west coordinates using the unit selected to determine the value of K.

Figure 5:
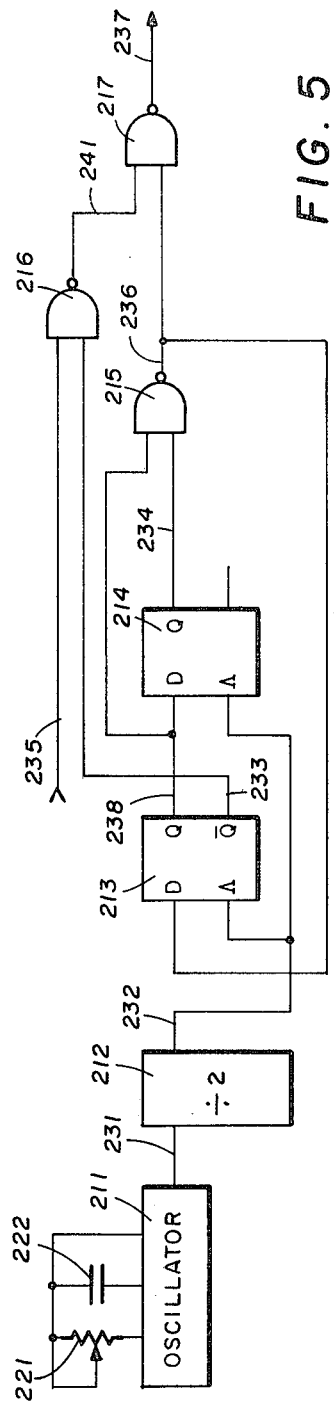
FIG. 5 is a logic diagram for the update transmitter modulator.
Figure 6:
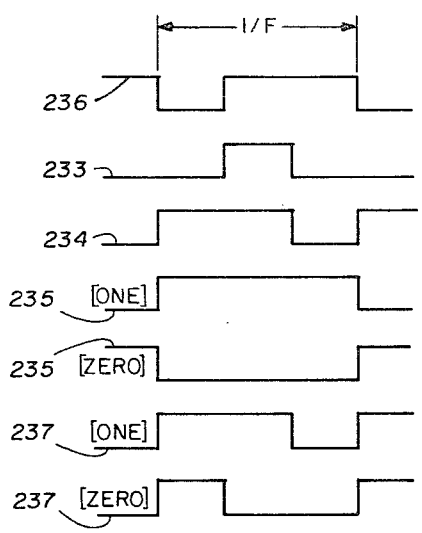
FIG. 6 is a waveform chart for the logic diagram of FIG. 5.

The update data modulation digital circuitry and signal waveforms for this circuit are shown in FIGS. 5 and 6, respectively. An integrated circuit 211 is an oscillator with the rate controlled by two external components, a variable resistor 221 and a capacitor 222. The output from the integrated circuit oscillator 221 is transmitted on line 231 to a divide-by-two integrated circuit 212. The output of the divide-by-two circuit 212 is transferred by means of line 232 to the clock inputs of D-type flip-flops 213 and 214. The complement output of the flip-flop 213 is conveyed by means of line 223 to the second input of NAND gate 216. The second output of the flip-flop 213 is connected through line 238 to the input of the flip-flop 214 and to one input of the NAND gate 215. The output of the flip-flop 214 is transferred by means of line 234 to one input of a NAND gate 215.

The serial data is input on line 235 to the second input of a NAND gate 216. The output of the NAND gate 216 is transferred by means of a line 241 to one input of the NAND gate 217 that has a second input tied to the output of the NAND gate 215 by means of a line 236. The output of the NAND gate 217 is the logically modulated serial data which is conveyed through line 237 to the modulation amplifier of the update transmitter.

In the present embodiment the integrated circuit oscillator 211 is a type CD 4047 chip. The divide-by-two circuit 212 is a type CD 4020 chip and the flip-flops 213 and 214 are combined in a type CD 4013 chip.

FIG. 6 shows the data waveforms for one data period for lines 236, 233, 234, 235 (data logic one), 235 (data logic zero), 237 (modulated logic one) and 237 (modulated logic zero) for the circuitry of FIG. 4. Data is input at a rate F with a period 1/F.

Circuitry of FIG. 5 operates to provide the modulation operation of the logical data transmission technique. The transmitter clock is provided by the oscillator 211. In one embodiment, the output of oscillator 211 is an 18 KHz signal transmitted on line 231 to the divide-by-two circuit 212. Divide-by-two circuit 212 provides a division-by-two with the output being a 9 KHz signal on line 232. Signals on line 232 are transmitted to the D-type flip-flops 213 and 214 and applied to the NAND gate 215 where it is divided by three to produce various signal waveforms on lines 236, 233 and 234 in FIG. 5. Each of these waveforms is at a 3 KHz rate with a period of one third millisecond. The one third millisecond period is further subdivided into three one ninth millisecond periods.

As illustrated in FIG. 6, the signal on line 236 is a logic zero for the first one third of the basic period and a logic one for the remaining two portions of the period. The signal on line 233 is a logic zero for the first portion, a logic one for the mid portion and a logic zero for the final portion. The signal on line 234 is a logic one during the first two portions and a logic zero during the final third portion. This data transmission system makes the overall vehicle locating system less dependent upon accurate oscillators such as a crystal oscillator and this system provides a self-clocking feature.

The serial data consisting of logical ones and zeros is entered on line 235. This data is either a logical one or zero for a full bit period, that is, one third of a millisecond. The signal 236 forces the output of the NAND gate 217 to always be a logic one during the first one third of the bit period. The final third of the bit period on line 237 is always a logic zero because line 223 is a logic zero during this one third forcing the output of the NAND gate 216 to a logic one. The other input to the NAND gate 217 is a logic one during this final one third of the period, therefore the output of this gate on line 237 must always be a logic zero during the final third of the bit period. The middle one third of the bit period is data dependent, that is, upon the input to line 235. During the mid portion of a bit period both lines 233 and 236 are logic ones. Thus, if the data on line 235 is a logic one the output of NAND gate 216 is a logic zero. Then the output of NAND gate 217 will be a logic one. If the data on line 235 is a logic zero the output of NAND gate 216 will be a logic one and the resulting output of NAND gate 217 will be a logic zero. Thus, the mid portion of the bit period on line 237 corresponds to the respective one or zero level of the serial data input on line 235. The corresponding logical ones and zeros for lines 235 and 237 are also shown in FIG. 6.

Figure 8:
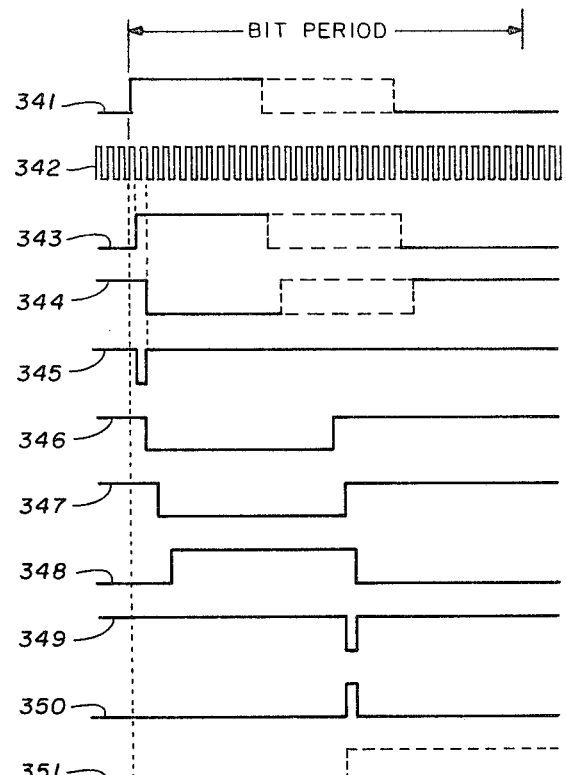
FIG. 8 is a waveform chart for the logic diagram of FIG. 7.

The update demodulation logic is shown in FIG. 7, with the related data demodulation waveforms shown in FIG. 8. The line numbers in FIG. 8 correspond to the waveforms in FIG. 7. Data is input on line 341 to D- type flip-flops 311 and 322. A 108 KHz clock signal is input on line 342 and supplied to the clock inputs of flip-flops 311, 312, 323 and 324. The output of the flip-flop 311 is transferred by means of line 343 to the input of the flip-flop 312 and to one input of a NAND gate 313. The complement output of flip-flop 312 is transmitted on line 344 to the second input of the NAND gate 313. The output of the NAND gate 313 is transmitted by means of line 345 to the clock input of a monostable multivibrator 314. The monostable multivibrator 314 provides an output whose duration is a function of the time constant of an RC network consisting of a resistor 315, a variable resistor 322 and a capacitor 321. The complement strobed output of the monostable multivibrator 314 is transmitted on line 346 to the input of the flip-flop 323. The output of flip-flop 323 is transmitted over line 347 to the input of the flip-flop 324 and one input of a NAND gate 325. The complement output of the D-type flip-flop 324 is transmitted by means of line 348 to the second input of the NAND gate 325. The output of the NAND gate 325 is transmitted over line 349 to an inverter 331 and through line 350 to the clock input of the D-type flip-flop 332. The output of flip-flop 332 on line 351 is the demodulated update logic data.

In the present embodiment the flip-flops 311, 312, 323, 324 and 332 are type CD 4013 chips. The monostable multivibrator circuit 314 is a type CD 4047 chip.

The functional operation of the demodulation logic is described by reference to FIGS. 7 and 8. Data input on line 341 is in the form described in FIG. 5 as the one and zero waveforms 237 in FIG. 6. Each modulated logic bit consists of three equal sections the first section being always a logic one, the center section determining whether the bit is a one or zero and the third section always being a logic zero. The purpose of the demodulation logic is to derive a clock pulse train from the input data and to determine the one or zero state of the center one-third section of the bit period.

A 108 KHz clock is provided on line 342 from an oscillator. The input data rate is approximately 3000 bits per second. Therefore there will be approximately thirty-six clock pulses during each data bit. The flip-flop 311 provides a one clock bit delay to the incoming modulated data shown as waveform 343. Flip-flop 312 provides another one bit clock delay and inverts the data as shown in waveform 344. NAND gate 313 compares the outputs of the two flip-flops 311 and 312 to detect a positive transition and provides an inverted one clock bit pulse at the time of this transition. This is shown as waveform 345.

Monostable multivibrator 314 provides an output which lasts for a fixed time delay after the pulse is received from NAND gate 313. This is shown as waveform 346. Flip-flop 323 provides a one clock bit delay which is shown as waveform 347. Flip-flop 324 inverts the singal and adds another one clock bit delay. This is shown as waveform 348. The NAND gate 325 compares the outputs of flip-flops 323 and 324 and provides a zero output at the time when the input waveforms are both logically one as shown by waveform 349.

The output of NAND gate 325 through the inverter 331 is the update clock which is a pulse occurring at the start of each bit of the demodulated data. Modulated data is input to flip-flop 332 on the line 341. The update clock provides the clock function for flip-flop 332 to strobe the input data at the center of each received data bit time.

The time constant of resistors 315, 322 and capacitor 321 are set such that the update clock occurs after a one-half data period delay, approximately 0.17 milliseconds. Therefore, flip-flop 332 is clocked on at the center of the middle one-third period of the three element modulated data period. This provides the sampling function which determines whether the center one-third of a data period is high or low and the bit is therefore a one or zero. The demodulated data is output on line 351. This data has a one-half period delay from the input modulated data.

The purpose of this data transmission technique with three elements where the first is always high, the last is always low and the center determines the one or zero status, is to reduce the oscillator accuracies needed in the transmitting and receiving systems. The design is such that the data sample will be taken in the center of the middle high or low segment. But the sample can be taken at any time during this middle segment. Thus the total drift of the oscillators can be as much as ±1/6 of the data rate frequency.

The vehicle locating system is provided with a capability for electronically rotating the heading angle. This circuitry is shown in FIG. 9 where the switches 421 through 428 provide the numerical input for the value of electronic rotation. Resistors 431 through 438 are connected to the respective switches to provide a low logic level when a switch is open and a high logic level when the switch is closed. The outputs of switches 421 through 428 are connected to a variable delay circuit 441. The system 1.08 MHz clock is input on line 450 to a divider circuit 443. The divider circuit 443 provides a divide-by-360 function. The system clock is also provided to circuits 441, 442 and 447. The output of the divider circuit 443 on line 451 is provided to an amplifier 444 and a pulse generator 445. The output of the amplifier 444 on line 453 is applied to a heading sensor 446, consisting of two Hall generators, and the output of the pulse generator 445 is transmitted by means of a line 452 to the fixed delay circuit 447. The output of the fixed delay circuit 447 is provided on line 455 to the input of a phase differential measurement circuit 442. The output from the heading sensor 446 is provided over a line 454 to a preamplifier 448. The preamplifier 448 output on line 449 is one input to the variable delay circuit 441 that produces a delayed output on line 456 to the phase differential measurement circuit 442.

Figure 10:
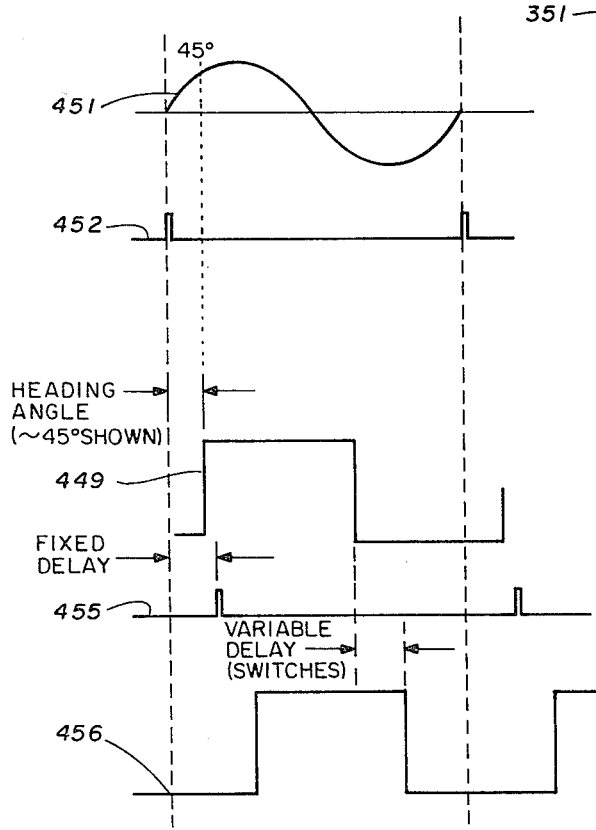
FIG. 10 is a waveform chart for the rotation circuitry of FIG. 9.

The operation of the electronic rotation function is shown in FIGS. 9 and 10. The system clock operates at 1.08 MHz and is input on line 450 to the divider circuit 443 that provides a divide-by-360 operation to produce a 3 KHz sine wave on line 451 as shown in FIG. 10. This waveform is input to amplifier 444 which provides the reference drive signal to the transverse Hall generator. A cosine reference drive signal (not shown) is provided to the heading Hall generator. The generator outputs are summed to produce the heading sensor 446 output. The output of the heading sensor on line 454 is a sine wave with a phase delay equal to the heading angle. The output of the heading sensor is amplified by preamplifier 448 to produce a squarewave whose phase is also a function of the heading angle A.

The numerical value of the electronic delay of circuit 441 is set into the system by closing the appropriate switches 421 through 428. The phase delay values in degrees for each switch are shown in parentheses. These switches are connected to variable delay circuit 441 which delays the squarewave output signal of the heading sensor preamplifier 448 by the amount so programmed. This delayed heading sensor output is one of the inputs to the phase differential measurement circuit 442.

The signal on line 451 is also input to the pulse generator circuit 445 that produces a 3 KHz pulse rate on line 452 as shown in FIG. 9. Delay circuit 447 provides a fixed delay for the 3 KHz input signal. The phase delay povided in this embodiment is approximately sixty degrees. This delayed 3 KHz pulse signal is input to circuit 442.

Circuit 442 measures the phase differential between the positive transitions on line 456 and the pulses on line 455. The output, phase difference, of circuit 442 on line 460 is the measurement of the compensated heading angle A.

In operation if no heading compensation is desired the switches 421 through 428 must be set with an angle of sixty degrees. This will delay the output of the heading sensor 446 the same amount as the fixed delay of the timing signal on line 455. Thus there will be no time differential between the signals on lines 456 and 455 when the sensor is pointed to magnetic north. If it is desired to electronically rotate the heading sensor output to produce a signal that is equivalent to a physical rotation of ten degrees counterclockwise, the switches 421 through 428 must be set to a value of 50 degrees. Under these conditions the heading sensor output signal on line 456 will lead the timing signal on line 455 by ten degrees if the heading sensor is facing magnetic north. If it is desired to simulate a physical clockwise rotation of 10 degrees of the heading sensor the switches 421 through 428 must be set to a value of 70 degrees. Again if the heading sensor is facing magnetic north this produces a differential of 10 degrees between the signals on lines 455 and 456 with the heading sensor signal being the delayed signal. Thus if the heading sensor is improperly physically mounted in the vehicle and is not facing magnetic north, the compensation can be done electronically rather than physically. In addition this circuitry can program to compensate for the local magnetic deviation in the earth's field.

In FIG. 10 the waveform 451 is the input to amplifier 444 and pulse generator 445. Waveform 452 is the output of pulse generator 445. The pulse is generated at the positive zero transition of the input signal. Waveform 451 is also one of the inputs to heading sensor 446. Waveform 449 is a sample output of heading sensor 446 for a heading angle A of 45 degrees. Waveform 455 is the output of delay circuit 447. Waveform 456 is an example of the output of variable delay circuit 441 for a heading angle A of 45 degrees with the variable delay switches set to 60 degrees.

While embodiments of the invention have been described in detail, modifications and alterations may occur to others upon a reading and understanding of the specification. It is intended to include all such modifications and alterations as fall within the scope of the appended claims.

What is claimed is:

1. The method of electronically rotating the heading signal output of a solid state Hall effect compass having a reference driving signal connected thereto to provide an electronically rotated heading signal, comprising the steps of:
   (a) inputting a rotation number that determines the magnitude of rotation desired to a delay means,
   (b) generating a timing signal that occurs at a fixed time delay following a positive going zero transition of said reference driving signal;
   (c) time delaying said heading signal output connected to the delay means wherein said delay depends on the rotation number, and
   (d) measuring the phase difference between the timing signal and the time delayed heading signal output of the delay means as an indication of an electronically rotated heading signal.

2. The method of electronically rotating the heading signal of a solid state compass as set forth in claim 1 including the step of generating a clock signal for synchronizing the steps of generating a timing signal, time delaying said heading signal and measuring the phase difference.

3. Apparatus for electronically rotating the magnetic heading signal output of a solid state compass, comprising:
   (a) means for generating a rotation number signal that determines the magnitude of rotation desired,
   (b) variable delay means responsive to the magnetic heading signal output and receiving the rotation number signal for time delaying the heading signal by an amount determined by the rotation number signal,
   (c) means for generating a timing signal, and
   (d) means receiving the time delayed heading signal and the timing signal for measuring the phase difference between the timing signal and the time delayed heading signal as an indication of an electronically rotated heading signal.

4. Apparatus for electronically rotating the heading signal of a solid state compass as set forth in claim 3 including means for generating a driving signal to the solid state compass and said means for generating a timing signal.

5. Apparatus for electronically rotating the heading signal of a solid state compass as set forth in claim 4 wherein said means for generating a rotation number signal includes an array of switches for programming the rotation number signal to said variable delay means.

6. Apparatus for electronically rotating the heading signal of a solid state compass as set forth in claim 4 wherein said means for generating a timing signal includes delay means responsive to the driving signal such that the timing signal occurs a fixed time delay following a transition point of the driving signal.

* * * * *